(12) United States Patent
Desai

(10) Patent No.: US 8,364,897 B2
(45) Date of Patent: Jan. 29, 2013

(54) CACHE ORGANIZATION WITH AN ADJUSTABLE NUMBER OF WAYS

(75) Inventor: Kiran R. Desai, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/954,375

(22) Filed: Sep. 29, 2004

(65) Prior Publication Data

US 2006/0069874 A1    Mar. 30, 2006

(51) Int. Cl.
*G06F 12/00* (2006.01)
(52) U.S. Cl. ................. 711/128; 711/E12.017
(58) Field of Classification Search .................... 711/128
See application file for complete search history.

(56) References Cited

U.S. PATENT DOCUMENTS

| | | | | |
|---|---|---|---|---|
| 5,781,924 A * | 7/1998 | Zaitzeva et al. | | 711/131 |
| 5,854,943 A * | 12/1998 | McBride et al. | | 710/51 |
| 5,970,235 A * | 10/1999 | Witt et al. | | 712/213 |
| 6,378,044 B1 * | 4/2002 | Luce et al. | | 711/133 |
| 6,516,386 B1 * | 2/2003 | Pang et al. | | 711/118 |
| 6,823,427 B1 * | 11/2004 | Sander et al. | | 711/136 |
| 2003/0177313 A1 * | 9/2003 | Iyer et al. | | 711/129 |
| 2004/0006669 A1 * | 1/2004 | Endo et al. | | 711/128 |
| 2004/0225841 A1 * | 11/2004 | Patwardhan et al. | | 711/128 |

* cited by examiner

*Primary Examiner* — Charles Rones
*Assistant Examiner* — Aracelis Ruiz
(74) *Attorney, Agent, or Firm* — Mnemoglyphics, LLC; Lawrence M. Mennemeier

(57) ABSTRACT

A method and apparatus for an adjustable number of ways within a cache is herein described. A cache may comprise a plurality of lines addressably organized as a plurality of ways, wherein the plurality of ways may be addressably organized as groups. The cache may also have associated cache control logic to map a memory address to at least one way within each group based on a predetermined number of bits in the memory address.

39 Claims, 11 Drawing Sheets

| 705 | 710 | 715 | 720 | 725 |
|---|---|---|---|---|
| Cache Size | Group Configuration (Every number representing a group and the # of ways within that group) (a(n-1),..,a2,a1,a0,s,f) | $2^s$ sets s | $2^f$ line size f | Tag Comparators |
| 16K | | | | |
| | (16) | 4 | 6 | 1 |
| | (8,8) | 4 | 6 | 2 |
| | (6,5,5) | 4 | 6 | 3 |
| | (4,4,4,4) | 4 | 6 | 4 |
| | (4,3,3,3,3) | 4 | 6 | 5 |
| | (3,3,3,3,2,2) | 4 | 6 | 6 |
| | (3,3,2,2,2,2,2) | 4 | 6 | 7 |
| | (2,2,2,2,2,2,2,2) | 4 | 6 | 8 |
| | (2,2,2,2,2,2,2,1,1) | 4 | 6 | 9 |
| | (2,2,2,2,2,2,1,1,1,1) | 4 | 6 | 10 |
| | (2,2,2,2,2,1,1,1,1,1) | 4 | 6 | 11 |
| | (2,2,2,2,1,1,1,1,1,1,1) | 4 | 6 | 12 |
| | (2,2,2,1,1,1,1,1,1,1,1,1) | 4 | 6 | 13 |
| | (2,2,1,1,1,1,1,1,1,1,1,1,1) | 4 | 6 | 14 |
| | (2,1,1,1,1,1,1,1,1,1,1,1,1,1) | 4 | 6 | 15 |
| | (1,1,1,1,1,1,1,1,1,1,1,1,1,1,1,1) | 4 | 6 | 16 |
| 19K | | | | |
| | (19) | 4 | 6 | 1 |
| | (10,9) | 4 | 6 | 2 |
| | (7,6,6) | 4 | 6 | 3 |
| | (5,5,5,4) | 4 | 6 | 4 |
| | (4,4,4,4,3) | 4 | 6 | 5 |
| | (4,3,3,3,3,3) | 4 | 6 | 6 |
| | (3,3,3,3,3,2,2) | 4 | 6 | 7 |
| | (3,3,3,2,2,2,2,2) | 4 | 6 | 8 |
| | (3,2,2,2,2,2,2,2,2) | 4 | 6 | 9 |
| | (2,2,2,2,2,2,2,2,2,1) | 4 | 6 | 10 |
| | (2,2,2,2,2,2,2,1,1,1) | 4 | 6 | 11 |
| | (2,2,2,2,2,2,1,1,1,1,1) | 4 | 6 | 12 |
| | (2,2,2,2,2,1,1,1,1,1,1,1) | 4 | 6 | 13 |
| | (2,2,2,2,1,1,1,1,1,1,1,1,1) | 4 | 6 | 14 |
| | (2,2,2,1,1,1,1,1,1,1,1,1,1,1) | 4 | 6 | 15 |
| | (2,2,1,1,1,1,1,1,1,1,1,1,1,1,1) | 4 | 6 | 16 |
| | (2,2,1,1,1,1,1,1,1,1,1,1,1,1,1,1) | 4 | 6 | 17 |
| | (2,1,1,1,1,1,1,1,1,1,1,1,1,1,1,1) | 4 | 6 | 18 |
| | (1,1,1,1,1,1,1,1,1,1,1,1,1,1,1,1,1) | 4 | 6 | 19 |

FIG. 7

| | Group 805 | Group 810 | Group 815 | | Group 820 | 885 |
|---|---|---|---|---|---|---|
| ABC | | | Sub Group 825 | Sub Group 830 | | |
| 000 | X | X | X | X | Way 855 | |
| 001 | X | X | Way 845 | Way 850 | Way 855 | |
| 010 | X | Way 840 | X | X | Way 855 | |
| 011 | X | X | Way 845 | Way 850 | Way 855 | |
| 100 | X | X | X | X | Way 855 | |
| 101 | Way 835 | X | Way 845 | Way 850 | Way 855 | |
| 110 | X | Way 840 | X | X | Way 855 | |
| 111 | X | X | Way 845 | Way 850 | Way 855 | |

890   X = other ways in that group not labled in Fig. 9

| | 1005 | 1010 | 1015 | 1020 | 1025 |
|---|---|---|---|---|---|
| | Cache Size | a3 (number of 8 way groups), a2 (number of 4 way groups), a1 (number of 2 way groups), a0 (number of 1 way groups) | $2^s$ sets | $2^f$ line size | Tag Comparators |
| | | (a3,a2,a1,a0) | s | f | |
| | 16K | | | | |
| | | (2,0,0,0) | 4 | 6 | 2 |
| | | (1,2,0,0) | 4 | 6 | 3 |
| | | (0,4,0,0) | 4 | 6 | 4 |
| | | (0,3,2,0) | 4 | 6 | 5 |
| 1030 | | (0,2,4,0) | 4 | 6 | 6 |
| | | (0,2,3,2) | 4 | 6 | 7 |
| | | (0,2,2,4) | 4 | 6 | 8 |
| | | (0,2,1,6) | 4 | 6 | 9 |
| | | (0,2,0,8) | 4 | 6 | 10 |
| | | (0,1,2,8) | 4 | 6 | 11 |
| | | (0,1,1,10) | 4 | 6 | 12 |
| | | (0,1,0,12) | 4 | 6 | 13 |
| | | (0,0,2,12) | 4 | 6 | 14 |
| | | (0,0,1,14) | 4 | 6 | 15 |
| | | (0,0,0,16) | 4 | 6 | 16 |
| | 19K | | | | |
| | | (2,0,1,1) | 4 | 6 | 4 |
| | | (2,0,0,3) | 4 | 6 | 5 |
| | | (1,2,0,3) | 4 | 6 | 6 |
| 1035 | | (1,1,2,3) | 4 | 6 | 7 |
| | | (1,1,1,5) | 4 | 6 | 8 |
| | | (1,1,0,7) | 4 | 6 | 9 |
| | | (1,0,2,7) | 4 | 6 | 10 |
| | | (1,0,1,9) | 4 | 6 | 11 |
| | | (1,0,0,11) | 4 | 6 | 12 |
| | | (0,2,0,11) | 4 | 6 | 13 |
| | | (0,1,2,11) | 4 | 6 | 14 |
| | | (0,1,1,13) | 4 | 6 | 15 |
| | | (0,1,0,15) | 4 | 6 | 16 |
| | | (0,0,2,15) | 4 | 6 | 17 |

FIG. 10

CACHE ORGANIZATION WITH AN ADJUSTABLE NUMBER OF WAYS

FIELD

This invention relates to the field of cache memories and, in particular, to cache organization.

BACKGROUND

Providing design flexibility in a cache by allowing a variety of size and associativity choices, while maintaining the speed of the cache in locating/storing a requested element, may be highly advantageous for architectures that utilize a cache. Traditionally, there have been three types of cache organizations that have been used: the fully associative, the k-way set associative; and the direct mapped cache organizations.

In a fully associative cache organization, each item of information from a main system memory is stored as a unique cache entry. There is usually no relationship between the location of the information in the cache and its original location in main system memory. Since, each storage location can hold information from any location in main system memory, complex and expensive cache comparison logic may be required to map the complete main system memory space. Furthermore, whenever a processor makes a memory request, each entry in a fully associative cache must be checked to see if the requested information is present (a hit), which forces a fully associative cache to stay extremely small as to not induce extremely large wait states in processing cycles.

The k-way set associative caches allow larger caches to be designed for a lower cost than fully associative caches, because less expensive and complex comparison logic is needed. Typically, a set associative cache divides the cache memory into k banks of memory, which is also known as k ways. To give a simplified example, if a 128 KB set associative cache has 4 ways, then each way may be 32 KB in size. Usually, a set associative cache sees memory as logically broken up into pages, which may be the size of each way. Continuing the example from above, a 256 KB main system memory may be logically viewed by the cache as 8 pages, each having a size of 32 KB.

Every location within a page of memory (such as the first location) may only be stored in the first location of each of the k ways. Therefore, in the example above, the first memory location in all 8 pages may be stored in only the first entry of any of the 4 ways. When a memory request is made, the set associative cache will compare the memory request with only the cache location the memory request would be stored at, in all of the ways. Since, the set associative cache need only compare the single location within each of the ways, the lookup times for memory requests may be much quicker than a fully associative cache. These faster lookup times allow for larger set associative caches to be designed. However, the ability to compare locations in multiple ways still requires complex and expensive comparison logic. For example, a 19 k low level cache with an associativity of 19 may possibly require 19 tag comparators and 19 ECC detectors. Because of the high costs of this circuitry, typically, for a low level cache only a 4 way set associative cache with a cache size of 16 k may be designed. The smaller number of ways may limit flexibility in the total size of the cache and may forfeit the extra 3 k of room in the low level cache.

In addition to the complex and expensive comparison logic, the traditional set associative cache has limitations on the choices for associativity of a cache for a given size. As an example, a traditional 16 k cache may, typically, only be designed with an associativity of 1, 2, 4, 8, or 16.

One variation of the set associative cache that may reduce the complexity and cost of the comparison logic is a direct mapped cache, which is effectively a one way set associative cache. Similar to the set associative cache, the direct mapped cache may view memory as broken into pages the size of the single way. From the example above, a 128 KB cache may have a single 128 KB way and may logically view a 256 KB memory as broken into two pages of 128 KB.

Yet, direct mapped caches may have limitations for some applications. First, when a program accesses two locations in memory, both at the same location in separate logically viewed pages, the direct mapped cache may have to update that location with every memory request (also known as thrashing). Thrashing eliminates any benefit of having a cache. Second, a direct mapped cache may be limited to a multiple of a power of two in design, since it contains only 1 way of $2^s$ sets. As an example, if a processor has room on the die for a six megabyte (6M) cache and a direct mapped organization is used, only a 4M cache may be implemented.

BRIEF DESCRIPTION OF THE DRAWINGS

The present invention is illustrated by way of example and not intended to be limited by the figures of the accompanying drawings.

FIG. 7 illustrates examples of potential group configurations for 16 k and 19 k caches.

FIG. 8a illustrates one embodiment of a cache organization with four groups, wherein one group has two sub groups, and an address with a predetermined number of bits.

FIG. 8b illustrates a partial mapping table of the predetermined number of bits depicted in FIG. 8a to 5 of the ways in the four groups depicted in FIG. 8a.

FIG. 10 illustrates examples of potential group configurations for 16 k and 19 k caches, wherein the first group has 8 way subgroups, the second group has 4 way subgroups, the third group has 2 way subgroups, and the fourth group has 1 way subgroups.

DETAILED DESCRIPTION

In the following description, numerous specific details are set forth such as examples of specific numbers of bits in an address, numbers of ways in a cache, placement of a cache, etc. in order to provide a thorough understanding of the present invention. It will be apparent, however, to one skilled in the art that these specific details need not be employed to practice the present invention. In other instances, well known components or methods have not been described in detail in order to avoid unnecessarily obscuring the present invention.

Figure 1:
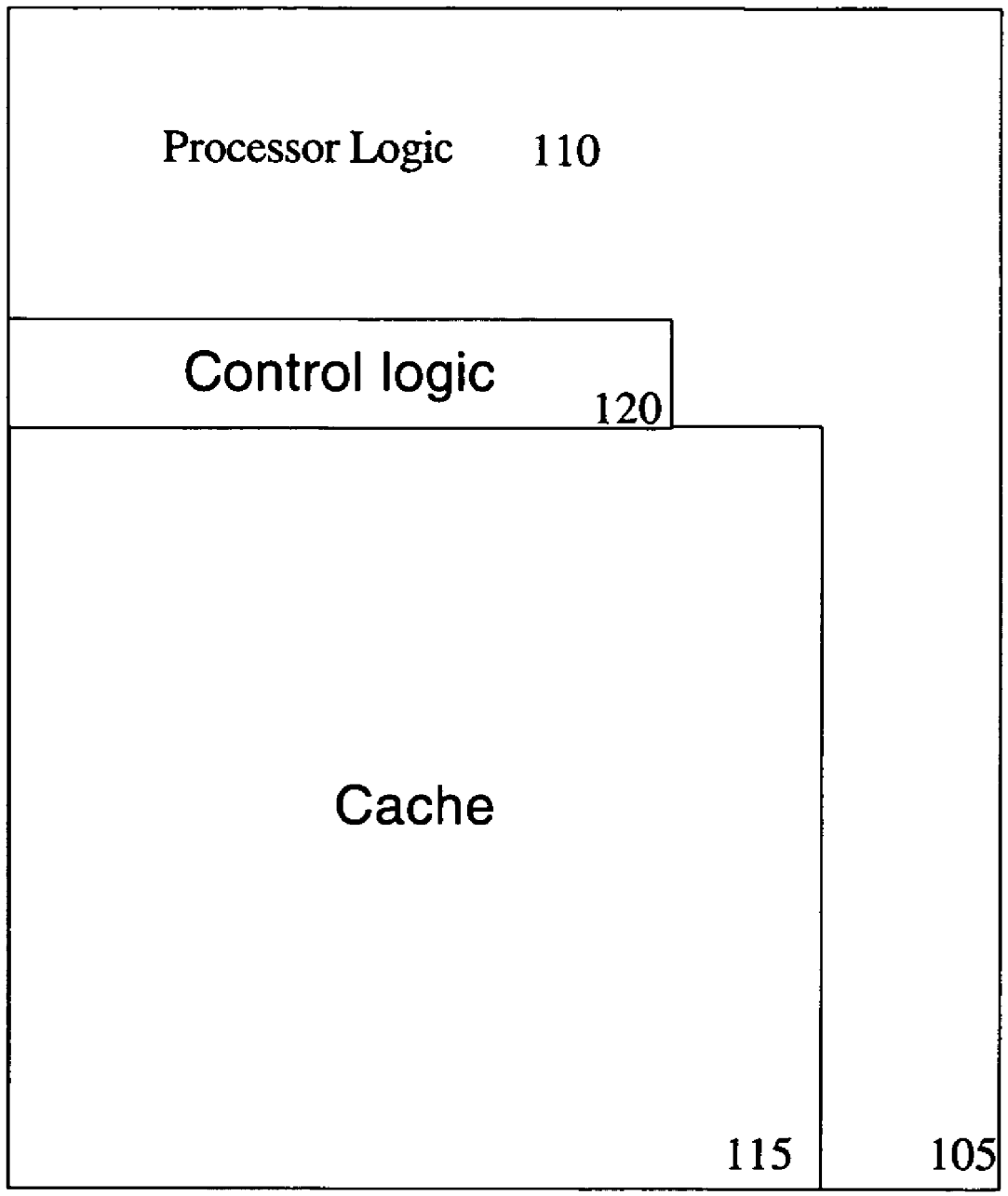
FIG. 1 illustrates an embodiment of a processor having an integrated cache.

FIG. 1 illustrates a microprocessor 105 having processor logic 110, control logic 120, and a cache 115. Microprocessor 105 may be a host processor capable of operating independently from another processor, a host processor operating in a multiprocessor system, or a microcontroller. Processor logic 110 may be any variety of transistors, circuits, and logic for processing data and/or instructions.

As an example, processor logic 110 may include any one, any plurality, or any combination of the following: a data path, an instruction path, a virtual memory addressing unit, a virtual memory address translation unit, an arithmetic logic unit (ALU), a floating point calculation unit capable of executing a single instruction or multiple instruction to operate on single or multiple data operands in serial or in parallel, capable of executing a single instruction or multiple instruction to operate on single or multiple data operands in serial or in parallel, a register, a bus controller, a bus interface, an architecture state register, an interrupt controller, an advanced programmable interrupt controller (APIC), a register file, a pre-fetch unit, an instruction fetch/decode unit capable of fetching and decoding instructions of fixed or variable length and x86 instructions, an instruction re-order unit, and any other logic that may be used for fetching or executing instructions and operating on data.

As stated above, microprocessor 105 may also have control logic 120 and cache 115. Although, FIG. 1 illustrates control logic 120 and cache 115 integrated with microprocessor 105, control logic 120 and cache 115 may be located away from microprocessor 105 and merely associated with microprocessor 105. Furthermore, cache 115 and control logic 120 may be located on the microprocessor's die. Control logic 120 may comprise any logic that performs the lookups, the comparisons, the requesting, and/or the storing of addresses, data, instructions, or locations for cache 115. Control logic 120 may include tag comparators, ECC detectors, and other logic commonly found in caches and cache control logic. Control logic 120 may be integrated within cache 115 or separate from cache 115. Control logic 120 will be discussed in more detail in reference to FIGS. 7, 8, and 10.

Figure 2:
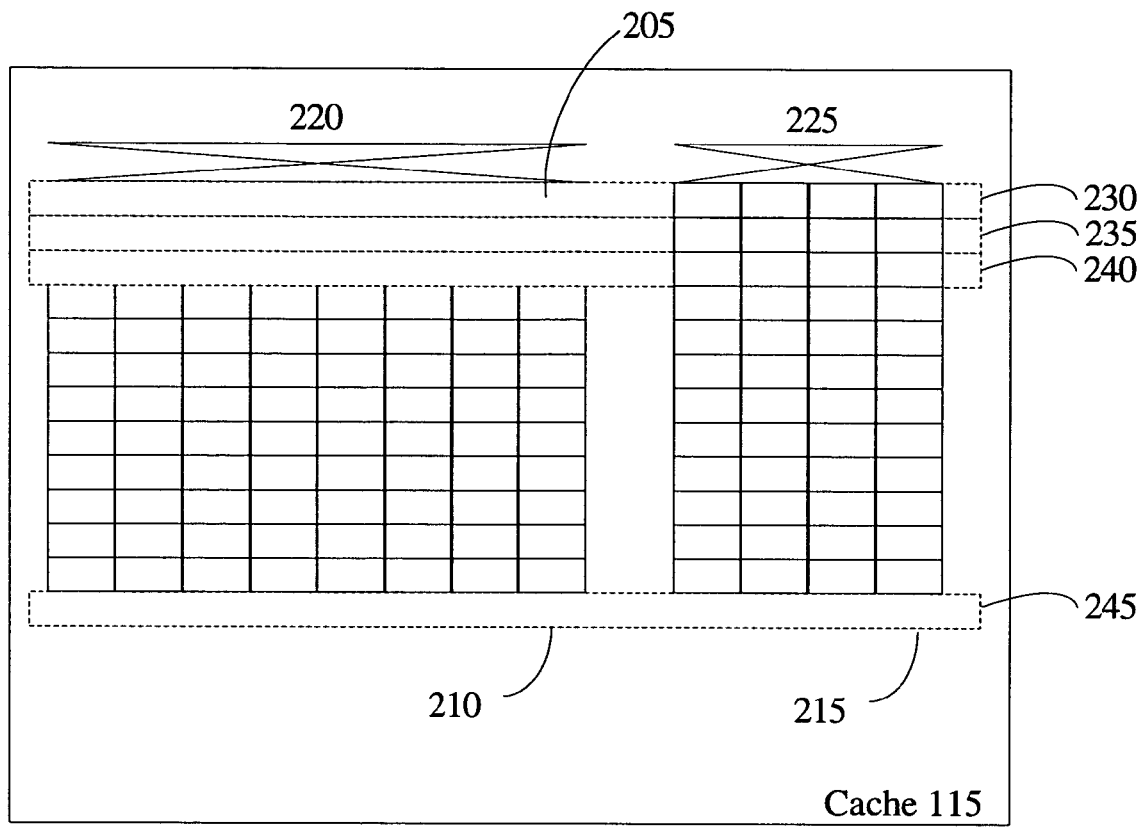
FIG. 2 illustrates an embodiment of a cache addressably organized into two groups, wherein the first group has eight ways/blocks and the second group has four ways/blocks.

Cache 115 may be any memory, memory array, or any other storing structure used for caching data or instructions. Referring to FIG. 2, one embodiment of how cache 115 may be addressably organized is shown. Cache 115 may include lines, also known as locations, cache entries, or memory cells, such as line 205. Line 205 and all other lines in cache 115 may be addressable as a plurality of ways (k ways), which are also known as blocks (k blocks). In FIG. 2, twelve ways/blocks are depicted within cache 115 as twelve columns, such as way 210 and way 215. It is readily apparent that cache 115 may have 2, 3, 4, 19, or any other number of ways. Within each way, lines, such as line 205, that have the same offset within their respective ways may form a set, such as set 230, which contains line 205, set 235, set 240, and set 245. As an illustrative example, cache 115 may have $2^S$ sets, which means that every way, such as way 210 and way 215, may have $2^S$ lines.

The twelve ways illustrated in FIG. 2 may be addressable as two groups, first group 220 and second group 225. As can be seen from FIG. 2, eight of the twelve ways, including way 210, are addressably organized as first group 220, while the remaining four ways, including way 215, are addressably organized as second group 225. As an example, if a traditional set-associative cache were to include twelve ways, unlike cache 115, the traditional cache would require twelve tag comparators and ECC detectors, as well as require long lookup times for comparing a location in all twelve ways. In contrast, cache 115 may be addressable as first group 220 and second group 225; therefore, only one way in each group may be compared, reducing the number of tag comparators to two. In addition, subgroups of group 220 and 225 may be created to compare any number of the ways within each group, leaving a cache designer with the freedom of designing any level of cache associativity. Subgrouping will be discussed in more detail with reference to FIGS. 8-10.

Figure 3:
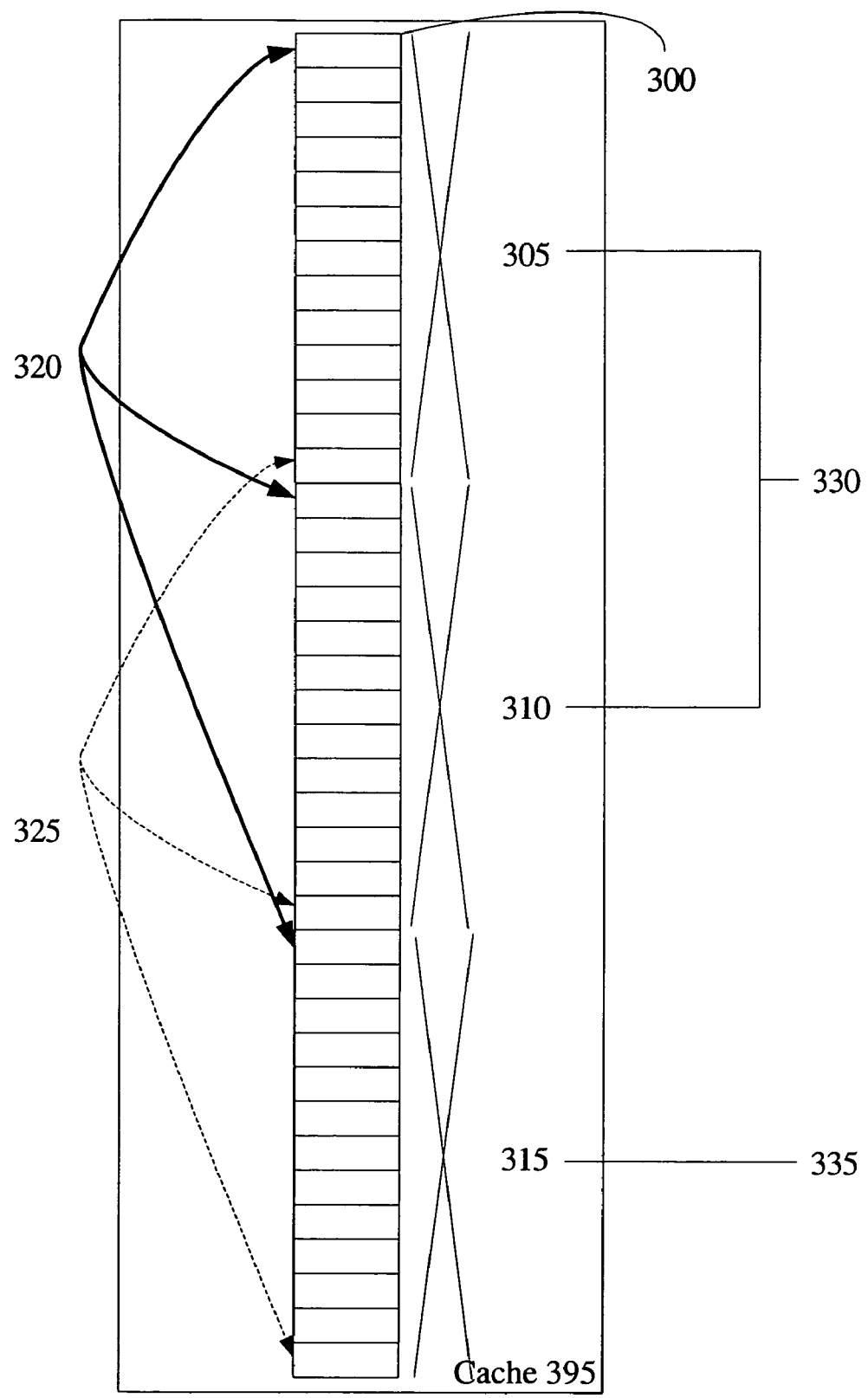
FIG. 3 illustrates one manner that memory cells may be addressable as sets, ways, and groups.

Turning to FIG. 3, a simplified example is depicted of how physically contiguous memory cells may be addressable as sets, ways, and groups to makeup a cache, such as cache 395. Each element, which may also be referred to as location, memory cell, or cache entry, of the same offset within each block may form a set, such as sets 320 and 325. Set 320 contains the first elements of block 305, 310, and 315, while set 325 contains the $13^{th}$ elements of each block. Array 300 may be addressable as three blocks/ways, such as block 305, 310, and 315. Blocks 305, 310, and 315 may be addressable as two groups, first group 330 and second group 335. Blocks 305 and 310 are addressably organized as first group 330, while block 315 is addressably organized as second group 335. In various embodiments, there may be any number of groups, ways, and sets within cache 395.

In addition, cache 395 is not limited to a one dimensional array, such as array 300. Cache 395 may have a multidimensional array, which represents sets, ways, and groups. For example, cache 350 may be a three-dimensional array, wherein the columns of the array are the blocks/ways and the rows of the array are the sets, while the third dimension of the array represents the groups. Cache 395 may also be implemented in non-contiguous storage devices, as well as multiple storage devices.

Figure 4:
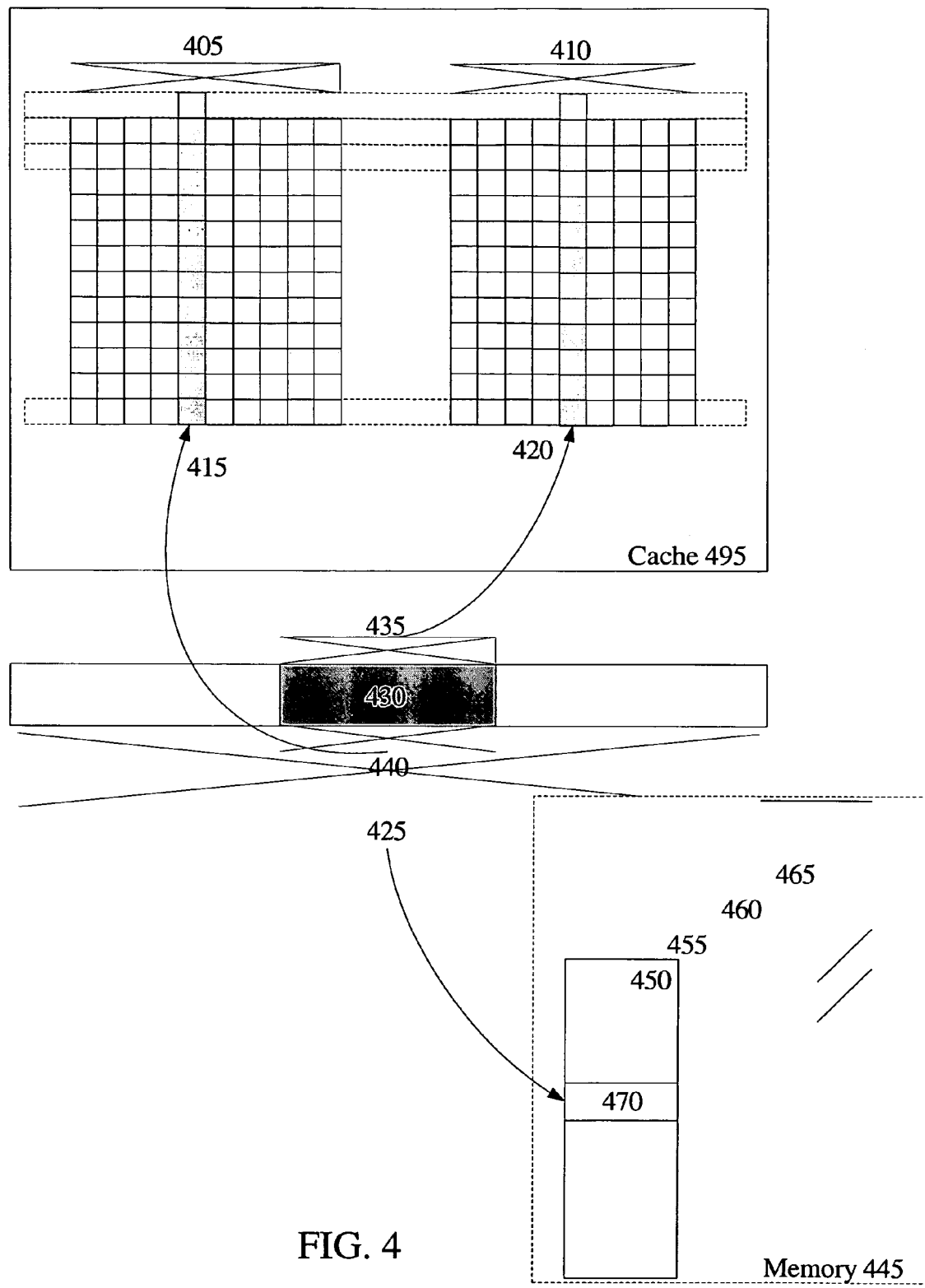
FIG. 4 illustrates one embodiment of a cache organization with a first group of ten ways and a second group of nine ways and an address with a predetermined number of bits, wherein the address is associated with a memory location within a memory that is logically broken up into pages.

Referring to FIG. 4, an embodiment of a cache organization with two groups, first group 405 and second group 410 is depicted. FIG. 4 illustrates cache 495 having 19 ways, wherein each way is shown as a column. The 19 ways may be addressable as two groups, such as group 405 and group 410. Group 405 may have ten ways, including way 415, while group 410 may have 9 ways, including way 420.

FIG. 4 also illustrates memory 445. Memory 445 may have any number of memory locations, such as location 470. Physically, memory 445 may be laid out in any manner. However, cache 495 may logically view memory 445 as broken up into pages, such as pages 450, 455, 460, and 465. In addition, the size of pages 450-465 may be the size of any one of the 19 ways in cache 495. As an illustrative example, cache 495 may have a total size of 608 KB, which may be split into the 19 ways, wherein each way has a size of 32 KB. If memory 445 has a total size of 256 KB, then memory 445 may be logically viewed by cache 495 as having 8 pages of 32 KB each. The memory may be logically broken into any size pages or not broken into pages at all.

Location 470 within memory 445 may store any element, data element, instruction, operand, data operand, or any combination of these or other items commonly stored in memory. Every memory location, such as location 470, may be referenced by or associated with an address, such as address 425. Control logic 120, shown in FIG. 1, may map/associate address 425 and/or location 470 with any number of ways within cache 495 based on predetermined number of bits 430 of memory address 425.

As an example, control logic 120 may associate location 470 with at least one way in group 405, such as way 415, based on first portion 440 of predetermined number of bits 430 and at least one way in group 410, such as way 420, based on second portion 435 of predetermined number of bits 430. Predetermined number of bits 430 may be any number of bits. First portion 440 and second portion 435 of predetermined number of bits 430 may be the same portion, as depicted in FIG. 4, partially overlapping portions, or fully separated portions of predetermined number of bits 430. As discussed later in reference to FIGS. 8-10, control logic 120 may also associate address 425 with more than one way in each group.

As more specific example, predetermined number of bits 430 may be four bits with the value of 0101. Control logic 120 may map address 425 to both way 415, based on first portion 440's value of 0101, and way 420 based on second portion 430's value of 0101. Therefore, any memory address, including memory address 425, which contains the value 0101 in the predetermined number of bits 430 field may be associated with way 415 and way 420. Therefore, when a lookup of address 425 for location 470 occurs within cache 495, cache 495 may only need to check way 415 and way 420. The lookup within cache 495 would only require two tag comparators and the time it takes to make two tag comparisons. In contrast, a traditionally set associative cache with 19 ways may have to check all 19 ways to see if the information of location 470 is currently stored in the cache. Additionally, the traditional set associative cache may require 19 tag comparators.

In this specific example, four bits were the minimum amount of bits used to address the ten ways within group 405 and the nine ways within group 410; however, any number of bits may be used for predetermined number of bits 430. Furthermore, predetermined number of bits 430 may be the same for addresses that are associated with a single location, multiple locations, or multiple pages, which may allow single locations, multiple locations, or multiple pages to be mapped/associated with the same ways in each group based on their addresses.

Much like traditional set associative caches, control logic 120 may map memory address 425 to a specific set within cache 495 based on a portion or predetermined number of bits of address 425 that are not specifically depicted. This portion or predetermined number of bits may be separate from, partially overlapping, or fully overlapping predetermined number of bits 430.

Figure 5:
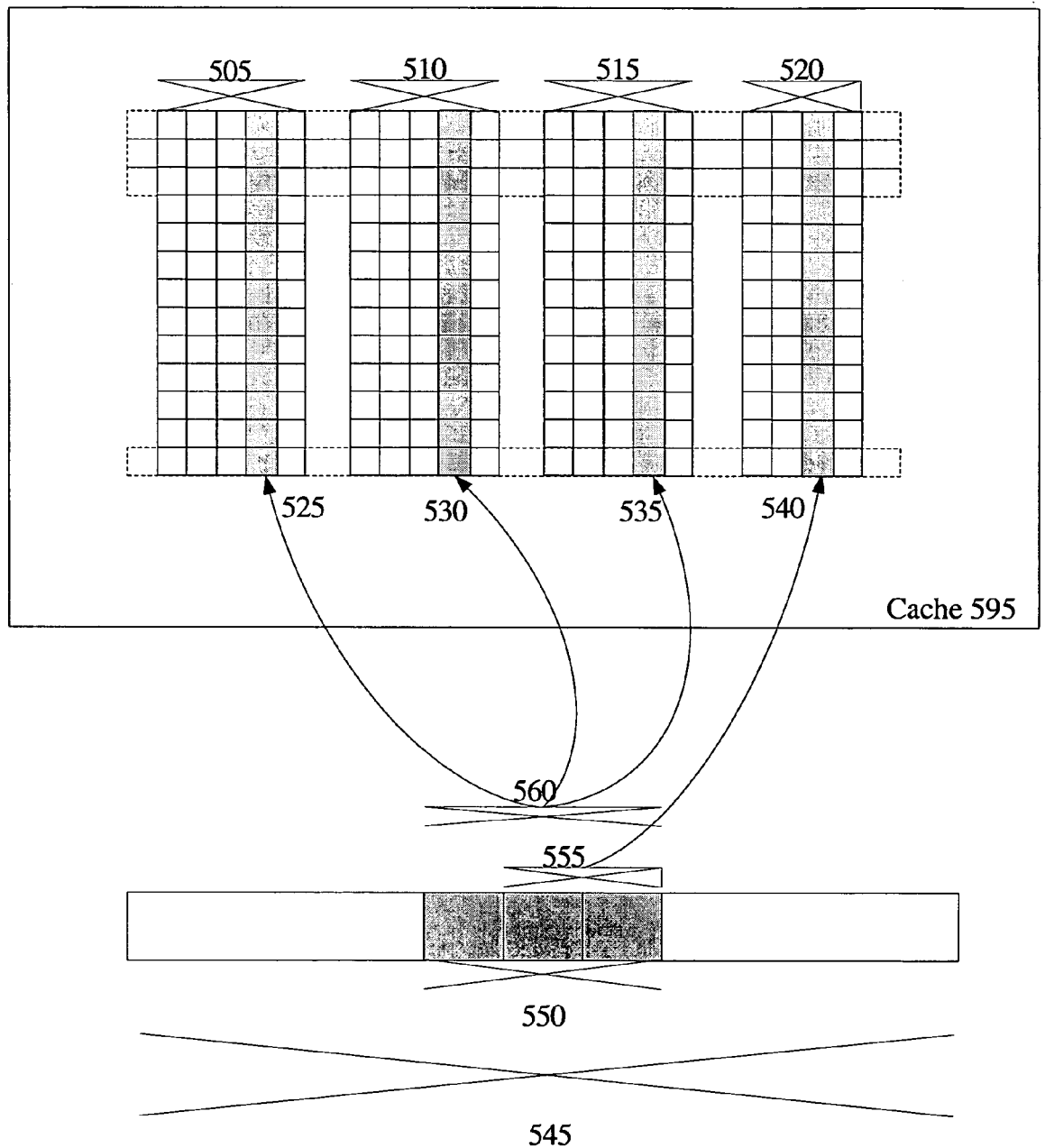
FIG. 5 illustrates one embodiment of a cache organization with four groups and an address with a predetermined number of bits.

Turning to FIG. 5, an embodiment of a cache organization with 19 ways addressably organized as four groups is shown. Cache 595 may have four groups, first group 505, second group 510, third group 515, and fourth group 520. Address 545, which may be associated with a storage location, has predetermined number of bits 550. In this specific embodiment, FIG. 5 depicts predetermined number of bits 550 to be three bits. However, predetermined number of bits 550 may be any number of bits.

Control logic, not depicted in FIG. 5, may map/associate address 545 to/with way 540 within fourth group 520 based on first portion 555 of predetermined number of bits 550. As there are four ways depicted in fourth group 520, only two bits of predetermined number of bits 550 may be used to select one of the four ways within fourth group 520. Address 545 may also be mapped to way 525 within first group 505, way 530 within second group 510, and way 535 within third group 515 based on second portion 560 of predetermined number of bits 550.

Since there are five ways within first group 505, second group 510, and third group 515, the minimum number of bits that may be used to select a single way within each group is three. However, any number of bits may be used. For example, first portion 555 may be separate from second portion 560 or may be partially overlapping. Second portion 560 may be partitioned so that there are three bits within predetermined number of bits 550 to map address 545 to any way in group 505, three separate or partially overlapping bits within predetermined number of bits 550 to map address 545 to any way in group 510, and three more separate or partially overlapping bits within predetermined number of bits 550 to map address 545 to any way in group 515.

Figure 6:
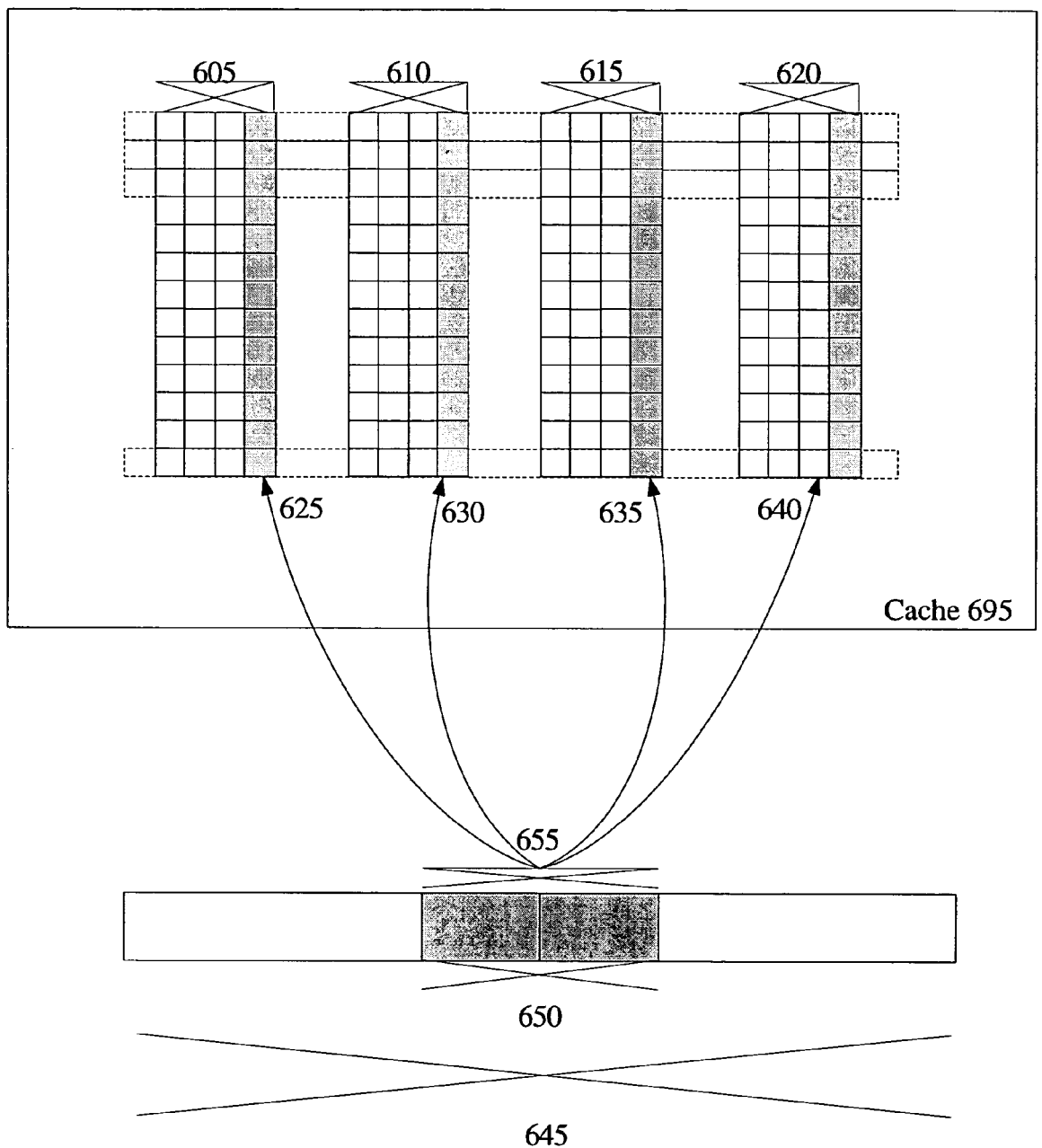
FIG. 6 illustrates one embodiment of a cache organization with four groups, each group having four ways/blocks, and an address with a predetermined number of bits.

FIG. 6 illustrates an embodiment of a cache organization with four equally sized groups. Cache 695 may have 16 ways where four ways are addressable as first group 605, four ways are addressable as second group 610, four ways are addressable as third group 615, and four ways are addressable as fourth group 620. Predetermined number of bits 650 within address 645 may have two bits. Since cache 695 is addressably organized into four groups each having four ways, two bits may address any single way within each group.

Control logic, not depicted, may associate address 645 to way 625 within first group 605, way 630 within second group 610, way 635 within third group 615, and way 640 within fourth group 620 based on first portion 655 of predetermined number of bits 650. Although, FIG. 6 depicts address 645 being associated with the last way within each group, control logic may associate address 645 with any way and is not limited to being the same number way in each group.

Turning to FIG. 7, textual illustrations of grouping configurations for 16K and 19K caches are shown. In column 705, the exemplary cache size of either 16K or 19K is listed. In column 710, group configurations are listed in parenthesis, wherein every number separated by a comma may represent the amount of ways addressable as a single group.

As an example, in row 730 there are four numbers separated by commas, which represents four groups. The number four in each of those positions represents that each group has four ways. The embodiment of FIG. 6 would be represented by row 730's group configuration, since FIG. 6 depicts four groups each having four ways/blocks. As another example, row 735 has a group configuration of (10,9), which may represent two groups, wherein one group has 10 ways and the second group has 9 ways. The embodiment of FIG. 4 may be represented by row 735's group configuration. As a final example, row 740 has a group configuration of (5,5,5,4), which may represent four groups, wherein one group has 5 ways, a second group has 5 ways, a third group has 5 ways, and a fourth group has 4 ways. The embodiment of FIG. 5 may be represented by row 740's group configuration.

Column 715 lists the number of sets within each group configuration, where the number in column 715 represents a power of two (s). As an example, in row 730, with a group configuration of (4,4,4,4), the table lists the number four, which represents 24 sets. All of column 715 lists the number 4, but any number of sets may be included within the cache. Column 720 lists the cache line size, where the number listed in column 720 represents a power of 2 (f). Continuing the example with row 730, column 720 lists the number 6, so the cache line size would be 26 bits. Finally column 725 lists the amount of tag comparators that may be used with each group configuration. Again in row 730, the table lists the number 4, which represents that four tag comparators may be used for this group configuration.

Figures 8A, 8B:
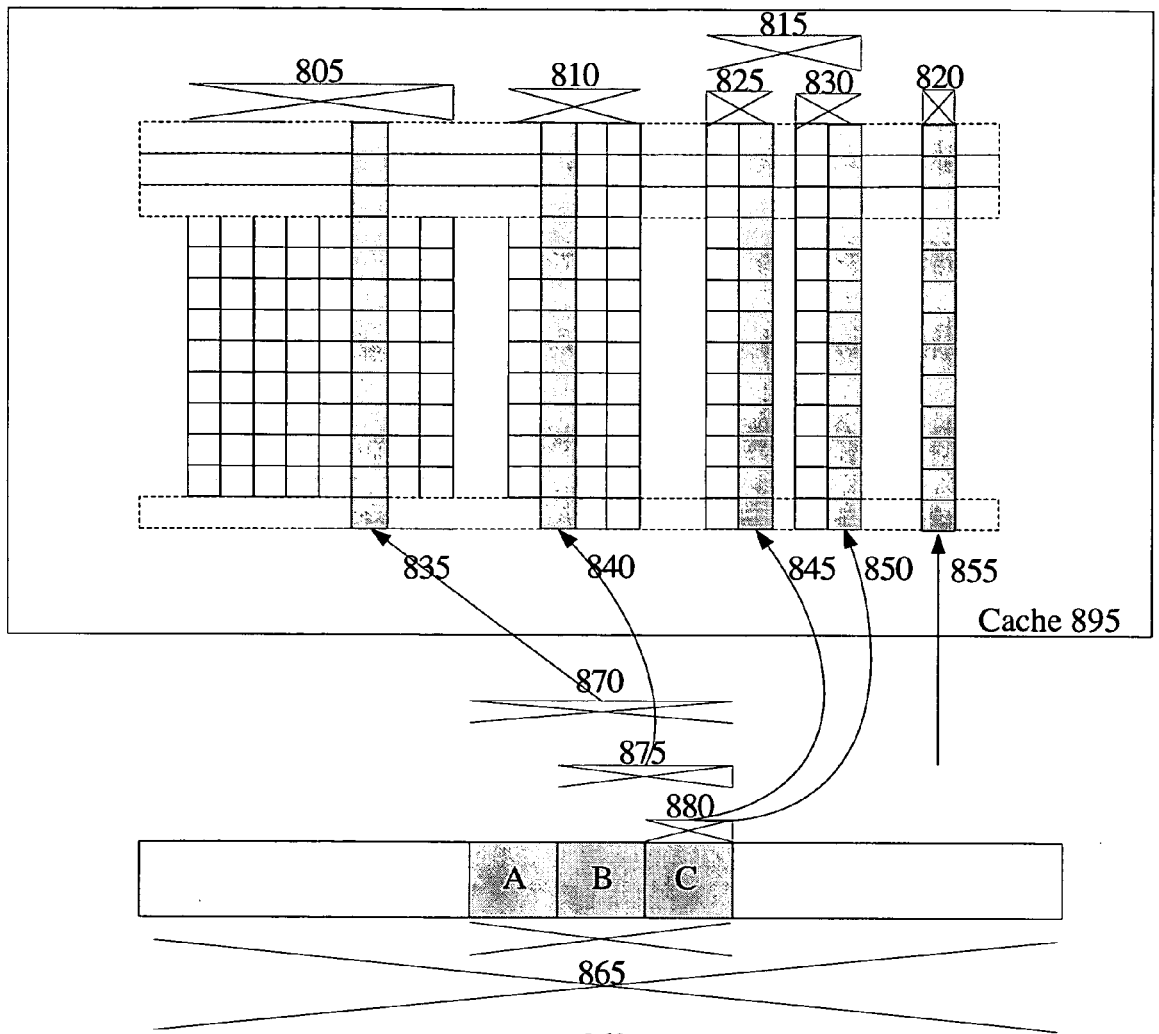

Turning to FIG. 8a, a cache organization is illustrated, wherein there are 17 ways addressable as four groups with one group having two sub groups. Above examples have been illustrated where an address is mapped to one way within each group. However, an address may be associated with any number of ways within a group. Control logic, not depicted, may map bit combinations to any number of ways within a group. Furthermore, ways may be addressably subgrouped so as to map an address to any number of ways within a group, as shown in FIG. 8a.

Cache 895 may have 17 ways addressably organized into first group 805 having eight ways, second group 810 having four ways, third group 815 having four ways, and fourth group 820 having one way. Address 860, which may be associated with a memory location, may have predetermined number of bits 865. In this embodiment, FIG. 8a depicts predetermined number of bits 865 to equal three. Address 860 may be associated with way 855 regardless of the value of predetermined number of bits 865. In this embodiment, group 820 only has a single way, therefore, anytime a lookup or store within cache 895 occurs way 855 may always be checked.

Address 860 may be mapped to way 845 and way 850 within group 815 based on first portion 880 of predetermined number of bits 865. In this embodiment there are two ways within subgroup 825 and two ways within subgroup 830, therefore, first portion 880 may utilize only one bit to select between the two ways in each subgroup. Address 860 may also be associated with way 840 in group 810 based on second portion 875 of predetermined number of bits 865. As an example, second portion 875 may be two bits to select between the four ways present in group 810. Finally, Address 860 may also be associated with way 835 in group 805 based on third portion 870 of predetermined number of bits 865. Third portion 870 is depicted as having all three bits to select between the 8 ways within group 805.

Predetermined number of bits 865 may be any number of bits. In FIG. 8a, predetermined number of bits may be six, where the first bit is for first portion 880, the next two bits are for second portion 875, and the next three bits are for third portion 870. Predetermined number of bits may be any number of bits less than six, wherein first portion 880, second portion 875, and third portion 870 are partially overlapping. Predetermined number of bits may also be any number greater than six bits, wherein more bits than required are used to map address 860 to at least one way in each group.

First group 805 illustrates eight ways, second group 810 illustrates four ways, third group 815 illustrates two subgroups of two ways each, and fourth group 820 illustrates one way; however, any number of ways may be in each group or subgroup. In addition, each of the groups may have subgroups, as well as the subgroups themselves may be subdivided.

FIG. 8b is an illustrative embodiment of a mapping table that control logic, not depicted in FIG. 8a or 8b, may implement to associate/map address 860 or any other address containing the same predetermined number of bits 865 to ways 835, 840, 845, 850, and 855. Column 890 lists the possible values of predetermined number of bits 865, while row 885 lists the groupings of the 17 ways. The mapping table is not completely filled in, leaving X's in positions that may be mapped to other ways within the groupings.

As an example of the mapping table, if predetermined number of bits 865 has the value 101, there would be five ways that address 860 would be associated with: way 835 in group 805, X in group 810 (not listed but may be any way in group 810), way 845 in subgroup 825 and group 815, way 850 in subgroup 830 and group 815, and way 855 in group 820. Therefore, in a cache lookup, cache 895 may only require 5 tag comparators to compare the five associated ways. In contrast, a traditional set associative cache may require 17 tag comparators to lookup locations in all 17 ways. Control logic may implement the mapping table from FIG. 8b or any other commonly used method in associating addresses with locations based on a predetermined number of bits of an address.

Figure 9:
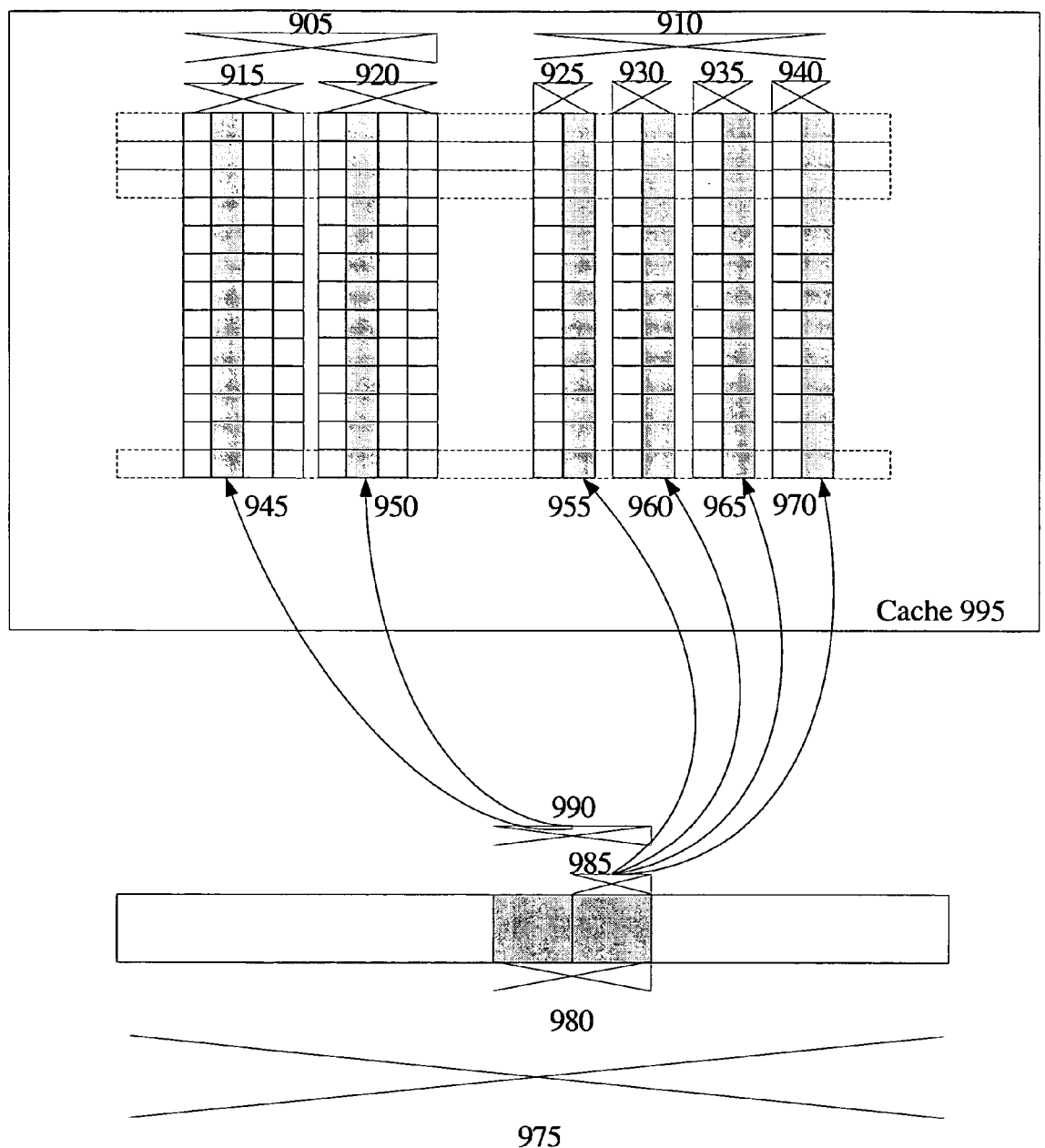
FIG. 9 illustrates one embodiment of a cache organization with two groups, wherein one group has two subgroups and the other group has four subgroups, and an address with a predetermined number of bits.

FIG. 9 illustrates another embodiment of a cache organization with two groups, wherein each group has subgroups. Cache 995 may have 16 ways, wherein the first eight ways are addressable has first group 905 and 8 ways are addressable as second group 910. Address 975, which contains predetermined number of bits 980, may be associated with at least one way in each group. Group 905 may have two subgroups 915 and 920, while group 910 may have four subgroups 925, 930, 935, and 940. Address 975 may be associated with four ways, way 955, 960, 965, and 970, in second group 910 based on first portion 985 of predetermined number of bits 980. Address 975 may be associated with way 915 and way 920 in first group 905 based on second portion 990 of predetermined number of bits 980. Therefore, 16 ways may be addressably organized so as to associate address 975 with 6 ways, which may only require six tag comparators instead of all 16 tag comparators.

Turning to FIG. 10, a table of group configurations for a four group cache is shown. Column 1005 lists two possible cache sizes, 16K and 19K. Column 1010 lists the group configurations for a four group cache, where the first group has subgroups of 8 ways, the second group has subgroups of 4 ways, the third group has subgroups of 2 ways, and the fourth group has subgroups of 1 way. Therefore, column 1010 lists (a3, a2, a1, a0), which are the number of subgroups in each group.

As an example, row 1035 lists (a3, a2, a1, a0) as (1, 1, 2, 3), which represents a one group with eight ways (a3=1), a second group of four ways (a2=1), a third group with two subgroups of 2 ways each (a1=2), and a fourth group with three subgroups of a single way each (a0=3). As another example, the embodiment of FIG. 9 may be represented by the group configuration of row 1030, (a3=0, a2=2, a1=4, a0=0). In FIG. 9, one group with two subgroups each having four ways and one group of four subgroups each having two ways is depicted.

The table in FIG. 10 contains specific example of four groups with subgroups of 8, 4, 2, and 1. However, any number of groups may be used and each subgroup may have any number of ways. Column 1015 lists an exemplary number of sets for each group configuration. Column 1020 lists an exemplary cache line size. Column 1025 lists the number of comparators that may be used in each cache organization listed.

Figure 11:
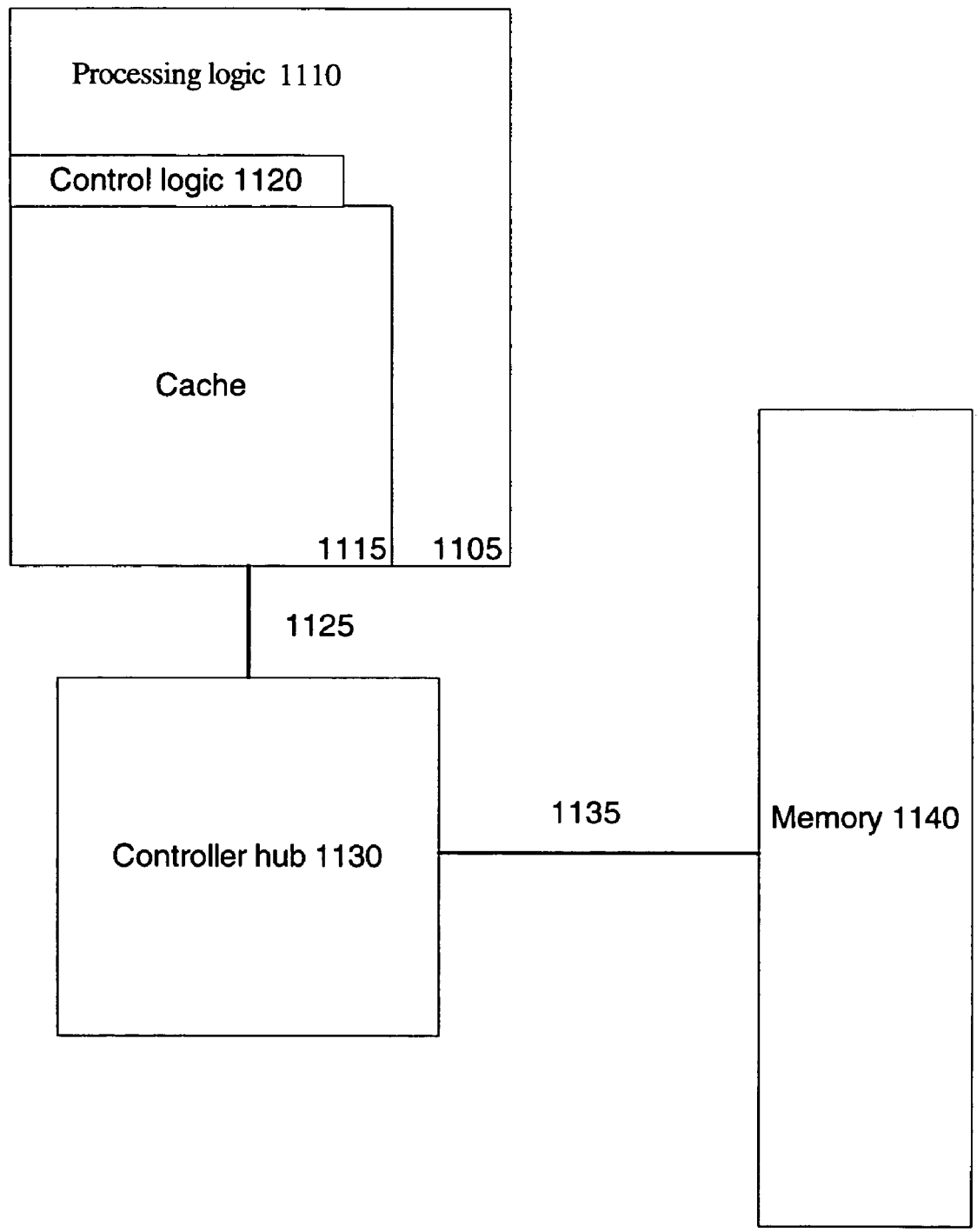
FIG. 11 illustrates a processor having an integrated cache coupled to a controller hub, wherein the controller hub is coupled to a memory.

Referring to FIG. 11, a system is shown having microprocessor 1105 having control logic 1120, cache 1115, processing logic 1110. Microprocessor 1105 is shown coupled to controller hub 1130 by bus 1125. Controller hub 1130 is also coupled to memory 1140 by bus 1135. Control logic 1120 and cache 1115 may be integrated with microprocessor 1105, present on microprocessor 1105's die, located away from microprocessor 1105 and merely associated with microprocessor 1105, located on controller hub 1130, and/or placed anywhere else in the system. In addition, microprocessor 1105 may be a host processor, a co-processor, or any other microprocessor for processing data and/or instructions.

Processing logic 1110 may comprise a data path, an instruction path, a virtual memory addressing unit, a virtual memory address translation unit, an arithmetic logic unit (ALU), a floating point calculation unit, a fixed point calculation unit, a register, a bus controller, a bus interface, and any other logic that may be commonly associated with a processor. Microprocessor 1105 may request an element with an associated address from cache 1115 and/or memory 1140.

The requested element may be a single or multiple data operands or an instruction. Control logic 1120 may read, scan, partition, or view a predetermined number of bits of the element's associated address.

Control logic 1120 may further determine at least one of a plurality of ways within any amount of groups to check if the element is present or currently stored in cache 1115 based on the predetermined number of bits. FIGS. 2-10 illustrate potential embodiments of a cache organization that cache 1115 may be addressably organized as, as well as examples of mapping an associated address to at least one way within a plurality of groups. Referring back to FIG. 8*b*, an illustration of how an associated address may be mapped to at least one way in each of a plurality of groups is depicted. In addition, control logic 1120 may check/compare locations or portions of code stored in locations within the determined way to check if the element is present.

Furthermore, if an element is not present within cache 1115, the element may be obtained from memory 1140 and stored in any of the determined ways in any of the groups. Any commonly used replacement algorithm for caches, such as replacing the oldest element stored or replacing the oldest element used by microprocessor 1105, may be used.

As noted above, a cache organization with an adjustable number of ways allows for design of a cache with any level of associativity. Traditional set associative caches require certain levels of associativity, as well as large amount of complex and expensive circuitry to handle high levels of associativity. By having multiple ways that are addressable as multiple groups any level of associativity may be obtained, as well as the amount of complex and expensive circuitry may be reduced. In addition, caches of odd sizes may be fully utilized by the correct groupings, where previously the associativity level of a traditional cache did not allow for partial usage of odd sized caches.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A cache comprising:
   a plurality of lines addressably organized as a plurality of ways, wherein the plurality of ways addressably organized as at least a first group including a first number of ways and a second group including a second number of ways, and wherein the first number of ways is a different positive integer from the second number of ways; and
   cache control logic to associate a memory address with one way of the first number of ways and to not associate the memory address with another way of the first number of ways within the first group based on a first portion of a predetermined number of bits in the memory address and to associate the memory address with one way of the second number of ways within the second group based on a second portion of the predetermined number of bits in the memory address.

2. The cache of claim 1, wherein the plurality of lines have a total size of 16K.

3. The cache of claim 1, wherein the plurality of lines have a total size of 19K.

4. The cache of claim 1, wherein the first number of ways are an even number of ways, and the second number of ways are an odd number of ways.

5. The cache of claim 4, wherein the predetermined number of bits in the memory address is a minimum number of bits needed to represent the larger of the even number of ways and the odd number of ways, and wherein the first and second portion of the predetermined number of bits is also equal to a minimum number of bits needed to represent the even number of ways and the odd number of ways, respectively.

6. The cache of claim 5, wherein the cache control logic comprises at least a first tag comparator associated with the first group of ways and a second tag comparator to be associated with the second group of ways.

7. The cache of claim 1, further comprising a third and a fourth group, wherein there are a first number of ways that are addressably organized as the third group, and there are a first number of ways are addressably organized as the fourth group.

8. The cache of claim 7, wherein the cache control logic further maps the memory address to at least one way in the third group based on a third portion of the predetermined number of bits of the memory address and at least one way in the fourth group based on a fourth portion of the predetermined number of bits of the memory address.

9. The cache of claim 8 wherein the predetermined number of bits in the memory address is a minimum amount of bits necessary to represent the larger of the first number of ways and the second number of ways.

10. The cache of claim 9, wherein the cache control logic comprises four tag comparators, each of the four tag comparators associated with one of the four groups of ways.

11. An apparatus comprising:
    a memory array comprising a plurality memory cells, wherein the plurality of memory cells are logically organized as a plurality of blocks, the plurality of blocks logically grouped into a plurality of groups, wherein at least one of the plurality of groups includes more than one of the plurality of blocks; and
    control logic to map a memory address to only one block within each of the plurality of groups based on at least a portion of a predetermined number of bits of the memory address.

12. The apparatus of claim 11, wherein the plurality of blocks are an even number of blocks.

13. The apparatus of claim 12, wherein each group includes at least two blocks: a first and a second block.

14. The apparatus of claim 13, wherein the predetermined number of bits of the memory address is one.

15. The apparatus of claim 14, wherein the control logic maps the memory address to the first block in each group if the one predetermined bit has a first logical value, and wherein the control logic maps the memory address to the second block in each group if the one predetermined bit has a second logical value.

16. The apparatus of claim 15, wherein the control logic comprises a tag comparator for each group.

17. A cache comprising:
    a first group having a first number of ways, wherein each way has an equal power of two sets, and wherein the first number of way is greater than one way;
    a second group having a second number of ways, wherein each way has an equal power of two sets;
    a third group having a third number of ways, wherein each way has an equal power of two sets;
    a fourth group having a fourth number of ways, wherein each way has an equal power of two sets, and wherein the first, the second, the third, and the fourth number of ways are each different positive integer numbers of ways; and control logic to directly map an address to at least one way in the first, second, third, and fourth groups based on at least a portion of a predetermined number of bits in the memory address, wherein the control logic does not map the address to all the ways within at least the first group.

18. The cache of claim 17, wherein the first group has eight ways, the second group has four ways, the third group has four ways, and the fourth group has one way.

19. The apparatus of claim 18, wherein the control logic directly maps the address to one of the eight ways in the first group, to one of the four ways in the second group, to two of the four ways in the third group, and to one way in the fourth group.

20. The apparatus of claim 19, wherein the predetermined number of bits in the memory address is three.

21. The apparatus of claim 20, wherein the control logic maps the address to the one of the eight ways in the first group based on all three of the predetermined bits, to the one of the four ways in the second group based on two of the three predetermined bits, to the two of the four ways in the third group based on one of the three predetermined bits, and to the one way in the fourth group regardless of the three predetermined bits.

22. The apparatus of claim 21, wherein the cache control logic comprises five tag comparators, wherein each of the first group, the second group, and the fourth group is associated with one of the five tag comparators, while the third group is associated with two of the five tag comparators.

23. A system comprising:
a microprocessor to generate a request, which comprises a virtual memory address, wherein the microprocessor has at least a virtual memory address translation unit to translate the virtual memory address to a physical memory address, an instruction fetch unit to fetch instructions, a decode unit couple to the instruction fetch unit to decode the fetched instructions, and a first level cache comprising a plurality of lines addressable as a plurality of ways, wherein the plurality of ways are addressable as at least a first group and a second group:
a system memory having a plurality of memory cells, wherein the physical memory address references at least one of the plurality of memory cells; and
cache control logic to receive the microprocessor request and map the physical memory address to at least one way within the first group based on at least a first portion of a predetermined number of bits of the physical memory address and at least one way within the second group based on at least a second portion of the predetermined number of bits of the physical memory address, and wherein the cache control logic is to not map the memory address to at least a second way in the second group based on at least the second portion of the predetermined number of bits.

24. The system of claim 23, wherein there are eight ways addressable as the first group and eight ways addressable as the second group, the predetermined number of bits of the physical memory address is three, and the cache control logic maps the physical memory address to two of the eight ways addressable as the first group based on two of the three predetermined number of bits of the physical memory address, and to four of the eight ways addressable as the second group based on one of the three predetermined number of bits of the physical memory address.

25. The system of claim 24, wherein the instruction fetch unit and the decode unit are operable to fetch and decode variable length instructions.

26. The system of claim 25, wherein the instructions are x86 instruction.

27. The system of claim 26, wherein the system memory is a dynamic random access memory.

28. The system of claim 23, wherein the memory cell is operable to store data.

29. The system of claim 23, wherein the memory cell is operable to store at least one instruction.

30. A method comprising
requesting an element with an associated address from a memory with a host processor, wherein the host processor has a virtual memory addressing unit;
reading a predetermined number of bits of the associated address;
determining one of a plurality of ways within a first group and one of a plurality of ways within a second group to check if the element is present based on at least a portion of the predetermined number of bits of the associated address;
determining a second way within the first group not to check to see if the element is present based on the at least a portion of the predetermined number of bits;
checking if the element is present within the one determined way in first group and the one determined way in the second group.

31. The method of claim 30, wherein the element is at least one data operand.

32. The method of claim 30, wherein the element is at least one instruction.

33. The method of claim 30, further comprising:
determining one of a plurality of ways within a third group and one of a plurality of ways within a fourth group to check if the element is present based on at least a portion of the predetermined number of bits of the associated address; and
checking if the element is present within the one determined way in the first group and the one determined way in the second group.

34. The method of claim 33, wherein the predetermined number of bits of the associated address is two.

35. The method of claim 34, wherein the first, second, third, and fourth group each have four ways.

36. The method of claim 35, wherein determining one of the four ways in the first group, the second group, the third group, and the fourth group to check if the element is present based on at least a portion of the predetermined two bits of the associated address comprises:
matching the predetermined two bits of the associated address to a predefined value in a mapping table, wherein the mapping table associates the predefined value with the one of the four ways in the first, second, third, and fourth groups.

37. The method of claim 30 further comprising:
obtaining the element with the associated address from memory if the element is not present in either the determined way in the first group or the determined way in the second group;
storing the element in either the determined way in the first group or the determined way in the second group based on a replacement algorithm.

38. The method of claim 37, wherein the replacement algorithm replaces the oldest element stored.

39. The method of claim 37, wherein the replacement algorithm replaces the oldest element requested by the host processor.

* * * * *